United States Patent [19]

Steger

[11] Patent Number: 4,597,615
[45] Date of Patent: Jul. 1, 1986

[54] STORAGE SYSTEM
[75] Inventor: Arthur Steger, Ferndale, Mich.
[73] Assignee: Andersen & Associates, Inc., Farmington Hills, Mich.
[21] Appl. No.: 596,729
[22] Filed: Apr. 4, 1984
[51] Int. Cl.⁴ .............................................. A47B 53/02
[52] U.S. Cl. ..................................... 312/201; 312/250
[58] Field of Search ............... 312/198, 199, 201, 250; 105/164, 41; 248/188.3, 647; 280/79.1

[56] References Cited

U.S. PATENT DOCUMENTS

| | | |
|---|---|---|
| 1,323,511 | 12/1919 | Welch . |
| 1,694,528 | 12/1928 | Clarkson . |
| 1,858,086 | 5/1932 | House . |
| 2,590,040 | 3/1952 | Rose . |
| 2,836,129 | 5/1958 | Jaeger . |
| 2,915,195 | 12/1959 | Crosby . |
| 3,094,363 | 12/1959 | Fremstad et al. . |
| 3,535,009 | 10/1970 | Cain . |
| 3,558,152 | 1/1971 | Miles et al. ........................ 280/79.1 |
| 3,567,299 | 3/1971 | Lundquist . |
| 3,724,389 | 4/1973 | Greaves . |
| 3,801,176 | 4/1973 | Higbee . |
| 3,877,391 | 4/1975 | Gimperlein et al. ................ 105/164 |
| 3,967,868 | 7/1976 | Baker . |
| 4,053,129 | 10/1977 | Graff .............................. 248/188.3 |
| 4,092,031 | 5/1978 | Greer et al. . |
| 4,192,564 | 3/1980 | Losert . |

FOREIGN PATENT DOCUMENTS

| | | |
|---|---|---|
| 231535 | 12/1958 | Australia . |
| 1262305 | 4/1961 | France . |
| 914980 | 1/1963 | United Kingdom . |

Primary Examiner—William E. Lyddane
Assistant Examiner—Joseph Falt
Attorney, Agent, or Firm—Harness, Dickey & Pierce

[57] ABSTRACT

A moveable storage system having one or more storage units, a plurality of flexible track elements conformable with an irregular supporting surface, and an individual base structure which supports each storage unit for movement along the track elements through roller members associated with particular track elements. One or more of the roller members is a load leveling articulated wheel assembly having a pair of spaced roller wheels operative to pivot about an articulation shaft to conform with flexible track profiles to accommodate supporting surface irregularities under and between various track elements spaced along the length of the storage unit.

23 Claims, 7 Drawing Figures

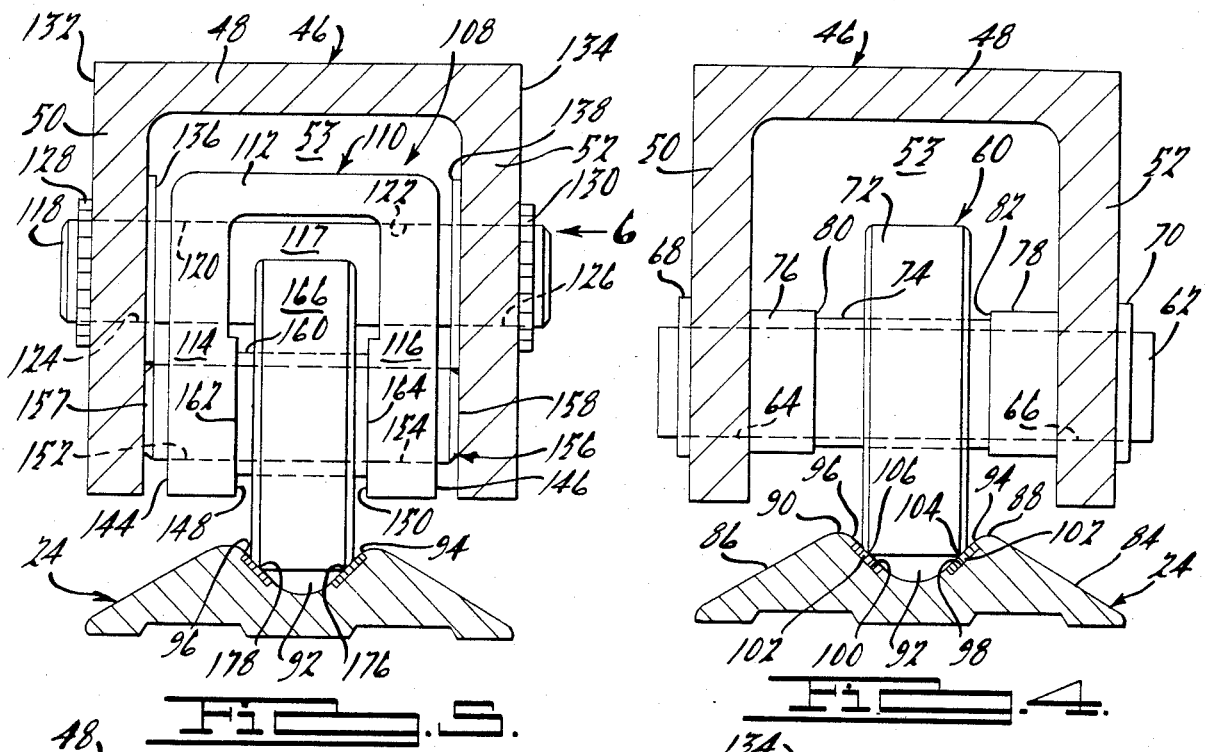
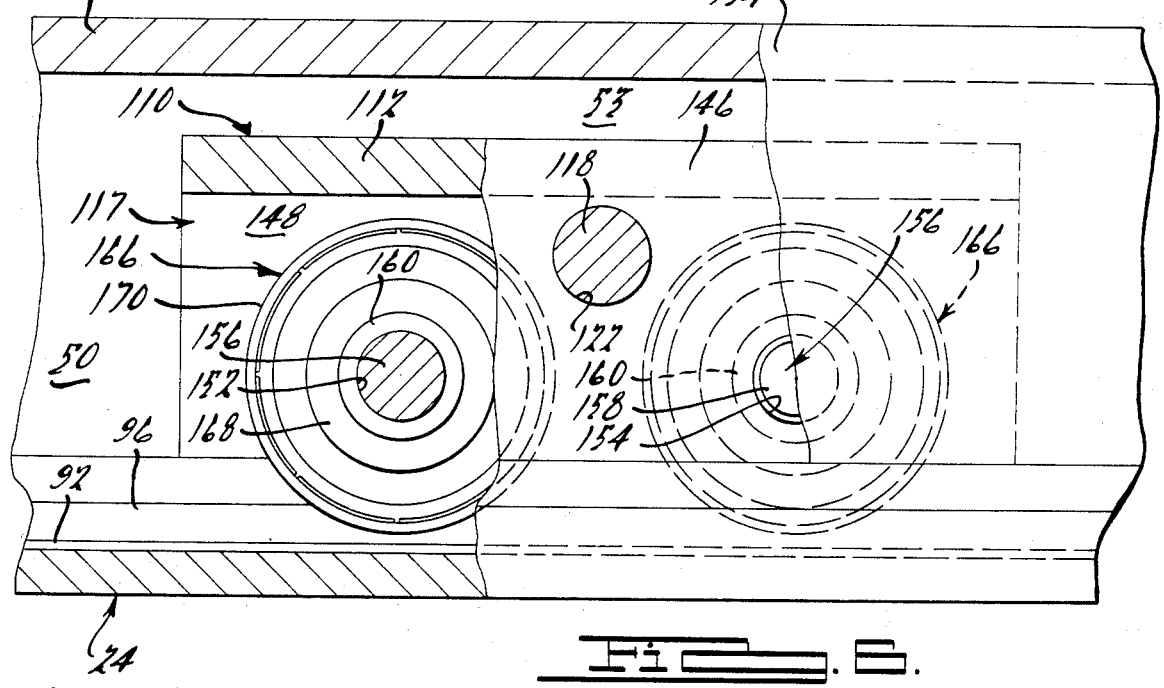
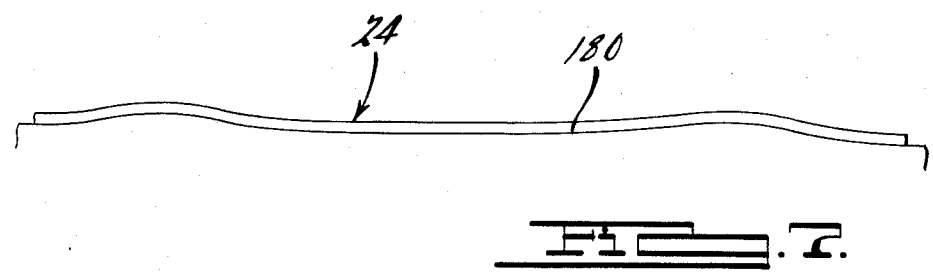

STORAGE SYSTEM

BACKGROUND AND SUMMARY OF THE INVENTION

The present invention relates to high density storage systems of the type having a plurality of individual moveable storage units, and more particularly, to an improved high density storage system specifically applicable for use with moveable storage units of fairly large dimensions.

Prior known high density storage systems have typically consisted of rows of storage sections supported upon a common base and moveable upon spaced parallel tracks through the provision of roller mechanisms or the like, with the length of the tracks being roughly equal to the total dimension of the various storage units when placed directly adjacent one another, plus the width of an access aisleway through which a person may have access to individual shelf sections. Such prior systems thus enable access to various individual storage sections as desired while minimizing space requirements for the overall system. The designs of certain of such prior high density systems have, however, certain disadvantages due to the fact that they have required relatively rigid track elements, necessitating accurate leveling in order to facilitate easy movement of the storage units.

An improved high density storage system which addresses the above-noted disadvantages is disclosed in U.S. Pat. No. 3,967,868, which is directed to a particular storage system utilizing a moveable support structure operative to be supported and guided by relatively flexible tracks which conform to the supporting surfaces over which the tracks are mounted. Such a storage system yields improvements in production economies, as well as installation and maintenance costs, due to the fact that it avoids the need for accurate leveling of the system. However, the ability of the above-noted system to accommodate supporting surface irregularities spanning relatively large dimensions, and/or individual storage units of fairly substantial size which define large storage areas above such irregular surfaces, has proved to be limited, so that additional efforts must be made to address leveling problems similar to those necessitated with storage systems utilizing rigid track elements, or to otherwise facilitate easy movement of such storage units when they are of fairly large dimensions.

It is, therefore, desirable to provide a new and improved high density storage system which facilitates easy movement of individual storage units of fairly large dimensions to provide access to particular storage units as desired. It is further desirable to provide such a large dimension high density storage system which reduces the need to provide accurate leveling of the associated tracks upon which the storage units are supported and guided for movement so that the system may be utilized on relatively irregular support surfaces.

The above and other features of the invention will become apparent from a reading of the detailed description of the preferred embodiment, which makes reference to the following set of drawings.

BRIEF DESCRIPTION OF THE DRAWINGS

FIG. 4 is a cross-sectional view taken in the direction of Line 4—4 of FIG. 2;

FIG. 5 is a cross-sectional view taken in the direction of Line 5—5 of FIG. 2;

FIG. 6 is an end view, partially broken away, and partially in section, taken generally in the direction of Line 6 of FIG. 5; and FIG. 7 is a schematic representation of a portion of the track system of the present invention.

DETAILED DESCRIPTION OF THE PREFERRED EMBODIMENT

Figure 1:
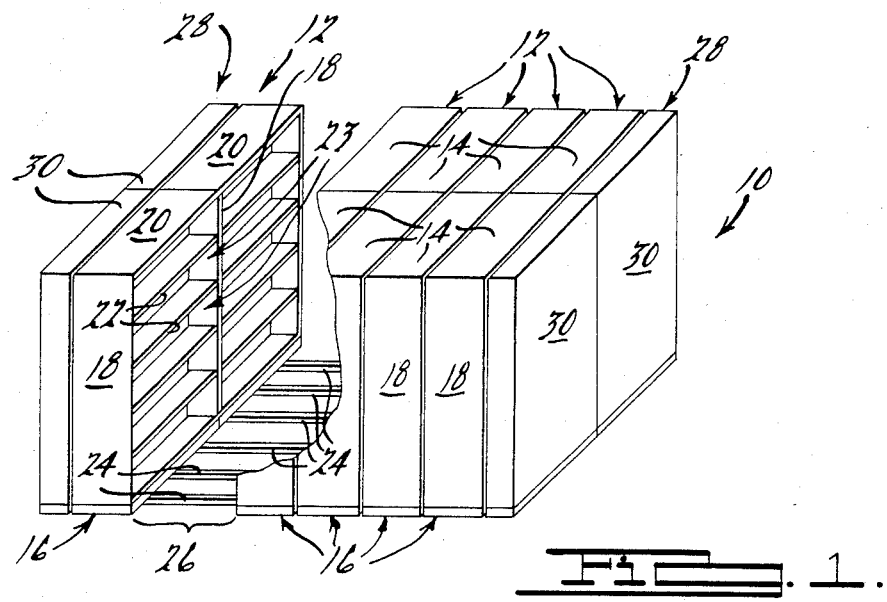
FIG. 1 is a perspective view, partially broken away, of a high density storage system in accordance with the present invention.

Referring now more specifically to the drawings, a high density storage system in accordance with the present invention is shown generally in FIG. 1 at 10. The storage system 10 includes a plurality of moveable storage units 12 arranged generally in an aligned relationship. Each of the storage units 12 includes a pair of aligned storage or shelf sections 14, with each such storage section 14 having an individually associated supporting base 16. Each of the individual storage sections 14 comprises a pair of spaced apart sidewalls 18 and an upper or top portion 20, as well as a plurality of horizontally extending shelves 22 operable to provide for individual storage stations 23 in each storage section 14. Each of the storage units 12 is adapted to be moved along a generally linear path defined by a plurality of tracks 24, with three of such tracks 24 associated with each of the bases 16 of the individual storage sections 14. The length of the tracks 24 is generally equal to the with of a typical aisleway 26 through which a person may have access to particular storage sections 14, and the sum of the overall width of each of the moveable storage units 12 when such units 12 are disposed directly adjacent to each other. The storage system 10 can also be optionally provided with a pair of fixed storage units 28 disposed at the opposite ends of the system 10 and having stationary storage sections 30.

Figure 2:
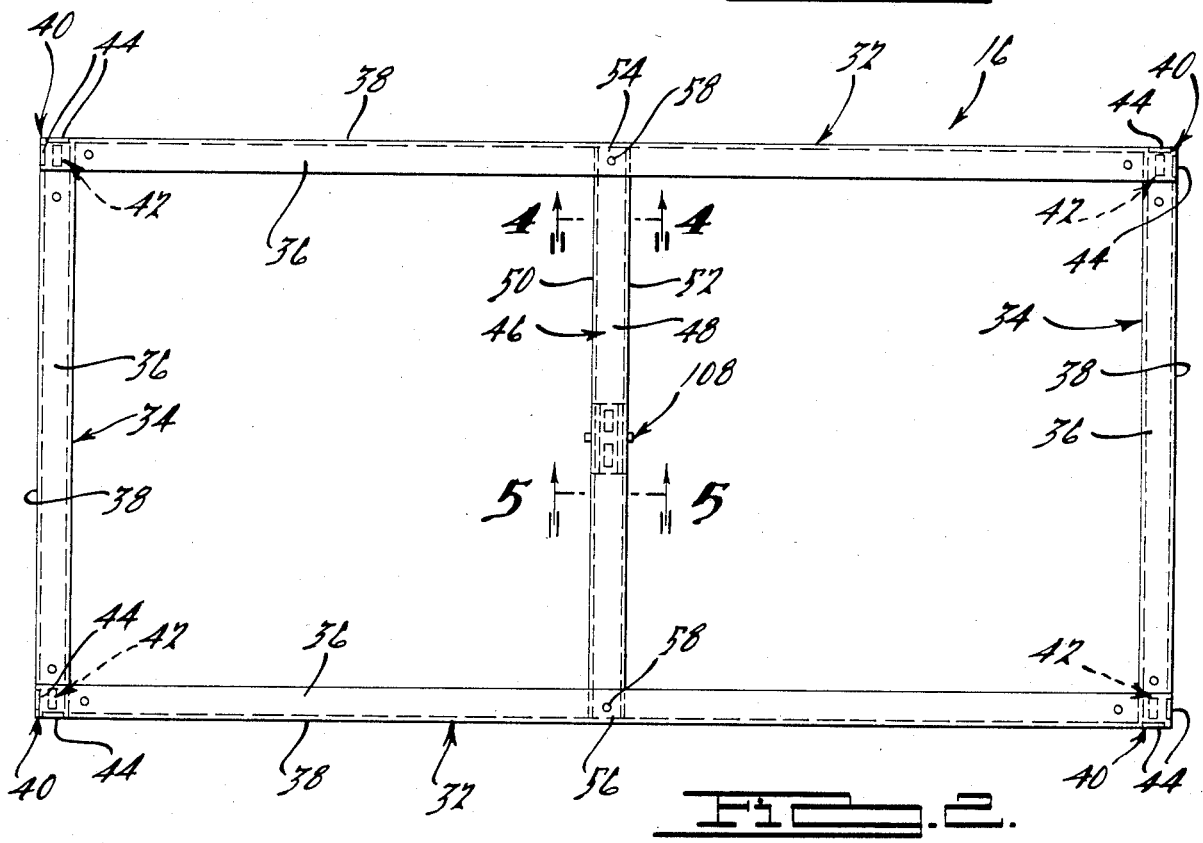
FIG. 2 is a top elevational view of a portion of the supporting system of the invention.
Figure 3:
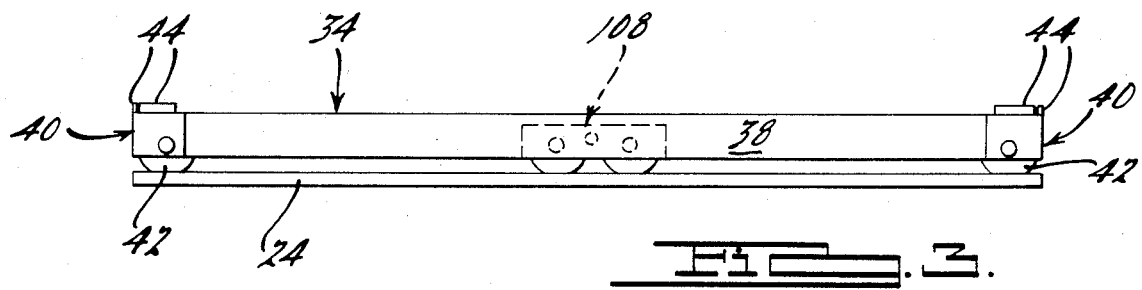
FIG. 3 is an end view of a portion of the system of the invention.

The individual base structure 16 for each of the storage sections 14 is shown more fully in FIGS. 2 and 3. Each base structure 16 includes a pair of longitudinally extending spaced generally parallel frame members 32 of a length roughly equal to that of its associated storage section 14. Transversely extending parallel end frame members 34 of a length roughly equal to the width of the storage section 14 communicate between the ends of frame members 32. Each of the frame members 32 and 34 comprises a generally right angle channel consisting of an elongated top portion 36 and a vertically depending side portion 38 oriented on an exterior or exposed side of the base structure 16. The adjacent ends of respective frame members 32 and 34 are matingly assembled through corner elements 40 such as disclosed in U.S. Pat. No. 3,967,868. Each of the corner elements 40 includes a wheel assembly 42 operative to be received within and supported for movement along an associated track 24, and upwardly depending flanges 44 to facilitate proper orientation and positioning of the individual storage sections 14 for support on and movement with the base structure 16. The base structure 16 further includes a transversely extending generally U-shaped midframe member 46 comprising a horizontal top portion 48 and a pair of spaced vertically extending sidewalls 50 and 52 which depend from top portion 48 and cooperate therewith to define an elongated channel 53 extending between frame members 32 as shown in FIGS. 4 and 5. The opposite ends 54 and 56 of midframe member 46 are matingly assembled with frame members 32 by threaded fasteners 58 which are received through top portions 36 of frame members 32 and top portion 48 of midframe member 46 so that midframe member 46 extends substantially normally between frame members 32 as shown in FIG. 2.

The base structure 16 also includes a pair of wheel assemblies 60 disposed at ends 54 and 56 of the midframe member 46, with one such wheel assembly 60 being illustrated in FIG. 4. The wheel assembly 60 includes a stub shaft 62 which extends across channel 53 with its opposite ends received within a pair of axially aligned through apertures 64 and 66 formed in sidewalls 50 and 52, respectively, of midframe member 46. The shaft 62 is retained against axial movement relative to sidewalls 50 and 52 by way of snap rings 68 and 70. The wheel assembly 60 further includes a rotatable bearing roller 72 supported for rotation on a sleeve bushing 74 carried on shaft 62, with the bearing roller 72 being free to move within channel 53 along the sleeve bushing 74 in the direction of the axis of shaft 62. However, the sleeve bushing 74 includes raised annular shoulders 76 and 78 at its opposite ends which define opposed limit faces 80 and 82 operative to limit the overall axial movement of the bearing roller 72 within channel 53. The bearing roller 72 is operative to be received and supported for movement by an associated track section 24, which, as shown in FIG. 4, includes a pair of upwardly inclined converging top surfaces 84 and 86 that terminate in arcuate lip portions 88 and 90. The track 24 further includes a recessed generally V-shaped groove 92 defined by sloped converging surfaces 94 and 96. The converging surfaces 94 and 96 are formed with recesses or slots 98 and 100, respectively, which extend along the length of track 24, and within which are retained elongated inserts 102 of wear resistant nylon, teflon, delrin or similar material. The cross-sectional shape of the track 24 is correlated with the axial dimension of bearing roller 72 so that the roller 72 will travel along the interior of the V-shaped groove 92 and will contact or engage surfaces 94 and 96 in generally "line contact", as indicated in FIG. 4 at 104 and 106. Such line contact between the lateral side edges of bearing rollers 72 and the track 24 minimizes frictional resistance to rolling movement of the bearing roller 72 within the track 24.

Midway along the length of midframe member 46, the base structure 16 further includes an articulated wheel assembly 108 disposed between sidewalls 50 and 52 as shown in FIGS. 2, 3 and 5. The articulated wheel assembly 108 includes an inner carriage 110 formed from a generally U-shaped extrusion to define a planar top portion 112 and spaced vertically extending sidewalls 114 and 116 which depend from top portion 112, and which cooperate with top portion 112 to define an elongated inner channel 117. An articulating axle or shaft 118 extends through inner channel 117 and is received within axially aligned circular bores 120 and 122 in sidewalls 114 and 116, respectively, in the manner shown in FIG. 5. The articulating axle 118 is of a length sufficient to extend through sidewalls 114 and 116, into and through channel 53, and through axially aligned bores 124 and 125 formed within sidewalls 50 and 52 of midframe member 46. Snap rings 128 and 130 are operative to be fitted about the opposite ends of the articulating axle 118 and cooperate with the outer surfaces 132 and 134, respectively, of sidewalls 50 and 52 to retain the articulating axle 118 against axial movement relative to midframe member 46. On the other hand, since the articulating axle 118 is received through aligned bores 120 and 122 in sidewalls 114 and 116 of inner carriage 110, the carriage 110 is supported within channel 53 for pivotal movement about the axis of axle 118, as well as for axial movement along axle 118. Annular nylon spacers 136 and 138 are provided upon axle 118 which are operative to engage the outer surfaces 144 and 146 of sidewalls 114 and 116, respectively, to limit the overall axial movement of carriage 110 within the channel 53.

As shown in FIGS. 5 and 6, communicating between the exterior surfaces 144 and 146 and interior surfaces 148 and 150 of the inner carriage 110 on either side of the articulating axle 118 are two spaced pairs of axially aligned bores 152 and 154 operative to receive spaced bearing shafts 156. As shown in FIG. 5, the bearing shafts 156 extend through inner channel 117 of carriage 110 on either side of and substantially parallel to articulating shaft 118, and are of a sufficient length so that their opposite ends 157 and 158 exit sidewalls 114 and 116 of carriage 110 into channel 53 and abut sidewalls 50 and 52 of midframe member 46. An elongated journal bearing 160 is carried upon each of the bearing shafts 156, with each such journal bearing 160 being of a length sufficient so that its opposite ends 162 and 164 are disposed adjacent the inner walls 148 and 150 of carriage 110. Supported for rotation upon each of the journal bearings 160 are bearing wheels 166, each of which is comprised of an inner race 168 and an outer race 170 which are free to rotate relative to one another through the provision of anti-friction bearing elements disposed radially between inner race 168 and outer race 170 in a conventional manner. Each of the bearing wheels 166 is also free to rotate about its associated journal bearing 160, and is free to move axially along its associated journal bearing 160 within the inner channel 117 in the direction of the axis of bearing shaft 156, with the limit of such axial movement of each such bearing wheel 166 defined by the inner surfaces 148 and 150 of sidewalls 114 and 116, respectively. On the other hand, since each bearing shaft 156 is supported within its associated aligned bores 152 and 154, each bearing shaft 156 and its associated bearing wheel 166 is fixed for pivotal movement with inner carriage 110 relative to and about the articulating shaft 118. The axial dimension of each bearing wheel 166 is such that it is operative to engage an associated track 24 and move therealong through line contact of its lateral edges with track surfaces 94 and 96 such as shown in FIG. 5 at 176 and 178. Such line contact enables each bearing wheel 166 to move along its associated track 24 with friction therebetween being kept to a minimum.

As so designed, the high density storage system 10 of the present invention can be utilized by mounting respective storage sections 14 directly upon the upper side of the individual base structures 16 and properly orientating and positioning each such storage section 14 upon its base structure 16 by way of the upwardly depending flanges 44 of the base stucture 16. When a user desires to obtain access to any particular storage section 14, the wheel assemblies 42, 60 and 108 of base structure 16 enable the remaining storage sections 14 to be moved along their associated tracks 24 to define and provide a desired access aisleway 26. The shape and construction of each of the tracks 24 is such that it is relatively flexible or deformable and therefore specifically suited to conform with the supporting surface upon which it is mounted, even though such surface may be of a relatively irregular profile. In this regard, reference is made to FIG. 7, wherein an exemplary track 24 is schematically illustrated mounted upon a relatively irregular support surface 180, which is shown in an exaggerated manner for illustrative purposes only. The track 24 will conform with such irregularities so as to obviate the need and expense of providing an extremely level surface and/or providing an ancillary support system between an irregular support surface and a relatively rigid track system such as utilized in prior known high density storage systems. One of the significant reasons that the tracks 24 can be utilized on such relatively irregular surfaces such as 180 resides in the fact that the various storage sections 14 and their associated individual base structures 16 will move over a relatively short portion of the total length of any particular track 24. The flexible and compliant nature of the track 24 thus only requires that an irregular profile over a limited distance be negotiated by any one base structure 16 to provide the necessary access aisleway 26 to a particular storage section 14. By virtue of the fact that only a single aisleway 26 is necessary to provide access to any particular storage section 14, an extremely high density storage system is achieved which enables individual access to particular units 14 in a relative effortless manner.

The present invention furthermore achieves a high density storage system that can facilitate easy movement of individual storage units 14 of fairly substantial size over irregular surfaces much more readily than previously known high density systems. In this regard, it should be noted that the prior system disclosed in U.S. Pat. No. 3,967,868 utilizes roller mechanisms associated with a pair of spaced parallel flexible tracks along which individual storage sections of up to 24"×36" can be easily moved. However, the utility of such a system diminishes with storage sections of substantially larger dimensions. This is because it has been found that larger dimension storage units may require a three point roller suspension associated with three parallel tracks spaced along the length of the storage unit. Yet such three point supporting systems exacerbate the problem of surface irregularities along the length of any particular storage unit. The present invention is specifically intended to address this problem through the provision of the individual base structures 16 having the above-described articulated wheel assemblies 108 that provide a novel and particularly useful load leveling feature. The system 10 thus yields a high density storage system having distinct advantages over prior known high density systems, since it can accommodate surface irregularities and enable movement of individual storage sections 14 of much greater dimensions than that heretofore thought possible with prior known systems. Through the provision of such a base structure 16 having the above-described features, it has been found that the system 10 is particularly suited for use with individual storage sections 14 of up to two to four feet in width and up to eight to nine feet in length.

The load leveling feature of the invention stems from the fact that each wheel assembly 108 is provided with a pair of spaced bearing wheels 166 specifically designed to pivot along with their supporting carriage 110 about an associated articulating shaft 118, with the limit of angular movement being determined by the engagement of top portion 112 of carriage 110 with top portion 48 of midframe member 46. The overall capability of the carriage 110 to so pivot will be determined by the length of carriage 110 and the distance between shaft 118 and top portion 48, and as is readily apparent, can be altered to suit particular applications as desired. The base structure 16 of the invention is thus more particularly suited to accommodate larger surface irregularities that may be exhibited between and under adjacent track members 24 than prior high density storage system designs. Moreover, by virtue of the fact that each of the bearing wheels 166, as well as their associated inner carriage 110, is adapted to float by moving axially along their respective bearing shafts 156 and articulating shaft 118, each of the bearing wheels 166 is also specifically suited to be guided within the V-shaped groove 92 of an associated track 24, even though the three tracks 24 which support and guide a particular base structure 16 may be somewhat out of parallel. It should be noted that each of the bearing wheels 166 is free to float axially independently of the other bearing wheel 166, and that the carriage 110 itself is also free to float independently of the bearing wheels 166. Moreover, the length of the spaced bearing shafts 156 is such that their opposed ends 157 and 158 abut sidewalls 50 and 52 of midframe member 46, and thus serve to keep the carriage 110 and wheels 166 properly aligned within midframe member 46 irrespective of the axial position of wheels 166 and carriage 110 on their respective shafts 156 and 118. The same axial floating feature is provided in each of the wheel assemblies 60 by virtue of the fact that the associated roller wheels 72 are free to float along their respective shafts 66. The design of the wheel assemblies 60 and 108 also reduces the problem of wheel seizure in the event of extreme misalignment or uneven load distribution about the base structure 16, since stub shaft 62, sleeve journal 74 and roller wheel 72 of assembly 60, as well as articulating shaft 118, bearing shafts 156, journals 160 and bearing wheels 166 of assembly 108, all have the ability to rotate about their respective axes independently of one another. As is readily apparent, the wheel assembly 108 can be provided in other locations along base structure 16, and its location in the drawings is intended to be exemplary only.

The above description is that of the preferred embodiment of the invention and various changes and modifications may be made thereto without departing from the spirit and scope of the invention as defined in the appended claims.

What is claimed is:

1. A moveable storage system comprising at least one storage unit, a plurality of relatively flexible track members mounted upon and conformable to a relatively irregular surface extending between spaced apart locations, a base structure being formed by a plurality of longitudinal and lateral support members, each member having two spaced apart depending portions, said base structure supporting each said storage unit and having a plurality of roller members supported by and operable to be guided by said track members to facilitate movement of said storage unit between said spaced apart locations, at least one of said roller members comprising an articulated wheel assembly associated with one of said track members, an articulation shaft defining a pivot axis extending substantially normally of the direction of travel along that track member, a carriage member supported by said articulation shaft for movement and said carriage being free to move axially along said articulation shaft between said depending portions, at least two rotatable spaced apart wheel assemblies operable to be supported and guided by that track member, said carriage member comprising an elongated generally U-shaped wheel housing having a pair of spaced apart depending sidewalls defining an elongated channel within which said wheel assemblies are supported for rotation, and said wheel housing extending beyond said wheel assemblies such that said wheel housing limits the angular movement of said carriage, with respect to said base structure member.

2. A moveable storage system as set forth in claim 1 wherein said wheel assemblies are supported for rotation about distinct axes extending substantially parallel to said pivot axis.

3. A moveable storage system as set forth in claim 1 wherein said articulation shaft is free to rotate relative to said depending portions.

4. A moveable storage system as set forth in claim 1 further comprising anti-friction spacers carried on said articulation shaft between said carriage member and each of said depending portions.

5. A moveable storage system as set forth in claim 1 wherein each of said wheel assemblies is supported for rotation within said channel by an associated bearing shaft.

6. A moveable storage system as set forth in claim 5 wherein each of said wheel assemblies is free to move axially relative to its associated bearing shaft within said channel.

7. A moveable storage system as set forth in claim 5 wherein each of said bearing shafts is supported for pivotal movement with said wheel housing about said articulation shaft.

8. A moveable storage system as set forth in claim 5 wherein each of said bearing shafts is supported adjacent its opposite ends within a pair of axially aligned through apertures in said depending sidewalls of said wheel housing and is free to rotate relative to said wheel housing within its associated through apertures.

9. A moveable storage system as set forth in claim 8 wherein the opposite ends of each of said bearing shafts extend through their associated through apertures and abuttingly engage the opposed faces of said depending portions of said base structure to retain said sidewalls of said wheel housing in a generally parallel relationship with said depending portions.

10. A moveable storage system as set forth in claim 8 wherein said bearing shafts extend substantially parallel to said articulation shaft, and said wheel housing is free to move axially along each of said bearing shafts between said depending portions of said base structure.

11. A moveable storage system as set forth in claim 5 wherein each said wheel assembly is supported for rotation about its associated bearing shaft between said depending sidewalls of said wheel housing by a journal member carried upon its associated bearing shaft, with said journal member being free to rotate about its associated bearing shaft independently of its associated wheel assembly.

12. A moveable storage system as set forth in claim 11 wherein each said journal member extends along its associated bearing shaft between said depending sidewalls of said wheel housing and each said wheel assembly is free to move axially along its associated journal member between said depending sidewalls of said wheel housing.

13. A moveable storage system comprising at least one storage unit and an individual base structure for supporting each said storage unit for movement along a plurality of spaced relatively flexible track members mounted upon and conformable to a relatively irregular surface, with each said base structure comprising a pair of spaced side frame members, a plurality of spaced cross-frame members matingly assembled between said side frame members to define a supporting frame for supporting its associated storage unit, a plurality of roller members disposed at distinct locations about said supporting frame and engageable with said track members for facilitating movement of said frame and said storage unit along said track members, at least one of said roller members being an articulated wheel assembly comprising an articulating shaft supported by one of said frame members to define a pivot axis and a roller carriage assembly supported by said articulating shaft for pivotal movement about said pivot axis, at least two roller wheels supported for rotational movement along an associated track member, said carriage assembly comprising an elongated generally U-shaped wheel housing having a pair of spaced apart depending sidewalls defining an elongated channel within which said roller wheels are supported for rotation, and said wheel housing extending beyond said roller wheels such that said wheel housing limits the angular movement of said carriage with respect to said frame member.

14. A moveable storage system as set forth in claim 13 wherein said pivot axis extends substantially normally of the direction of travel along the track member with which said roller wheels are associated.

15. A moveable storage system as set forth in claim 13 wherein one of said cross-frame members comprises a generally horizontal top portion and a pair of spaced vertically extending sidewalls depending from said top portion and which cooperate with said top portion to define an elongated channel extending between said side frame members, and said articulating shaft extends transversely through said channel between said sidewalls generally parallel to said top portion and supports said carriage assembly for pivotal movement within said channel.

16. A moveable storage system as set forth in claim 15 wherein the opposite ends of said articulating shaft are received within axially aligned bores in said sidewalls and said articulating shaft is free to rotate about said pivot axis within said bores.

17. A moveable storage system as set forth in claim 15 wherein said carriage assembly is free to move axially along said articulating shaft within said channel between said sidewalls.

18. A moveable storage system as set forth in claim 15 wherein said roller wheels are supported for rotation about individual bearing shafts at distinct locations on opposite sides of a plane extending through said articulating shaft and normally of said top portion of said cross-frame member.

19. A moveable storage system as set forth in claim 13 wherein said roller wheels are supported for rotation about respective bearing shafts extending generally parallel to said pivot axis and are free to move axially along their respective bearing shafts.

20. A moveable storage system as set forth in claim 19 wherein each of said roller wheels is free to move along its associated bearing shaft independently of the other of said roller wheels.

21. A moveable storage system as set forth in claim 13 wherein said supporting frame includes three of said cross-frame members extending between said side frame members, with two of said cross-frame members being matingly assembled between the opposite ends of said side frame members to define a generally rectangular outer frame and the third cross-frame member being matingly assembled between said side frame members and within said rectangular outer frame, and at least two of said roller members are disposed at locations along each of said cross-frame members.

22. A moveable storage system as set forth in claim 21 wherein three of said roller members are disposed along one of said cross-frame members, with one of the three roller members being said articulated wheel assembly.

23. A moveable storage system as set forth in claim 21 wherein one of said roller members is disposed at the junction between each of said cross-frame members and said side frame members, and said articulated wheel assembly is disposed along the middle cross-frame member and between said side frame members.

* * * * *